(12) United States Patent
Tran et al.

(10) Patent No.: US 12,482,510 B2
(45) Date of Patent: Nov. 25, 2025

(54) ROW-HAMMER CONDITION MITIGATION USING A PHYSICALLY ADJACENT ROW MAPPING TABLE

(71) Applicant: QUALCOMM Incorporated, San Diego, CA (US)

(72) Inventors: Sang Tran, Encinitas, CA (US); Hung Vuong, Coronado, CA (US); Rongtian Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 122 days.

(21) Appl. No.: 18/534,030

(22) Filed: Dec. 8, 2023

(65) Prior Publication Data

US 2025/0191633 A1   Jun. 12, 2025

(51) Int. Cl.
  *G11C 7/00*   (2006.01)
  *G11C 11/406*   (2006.01)
  *G11C 11/4078*   (2006.01)

(52) U.S. Cl.
  CPC .. *G11C 11/40618* (2013.01); *G11C 11/40615* (2013.01); *G11C 11/4078* (2013.01)

(58) Field of Classification Search
  CPC ............ G11C 11/406; G11C 11/40615; G11C 2211/4061; G11C 11/40618; G11C 2211/4067
  USPC ....................................................... 365/222
  See application file for complete search history.

(56) References Cited

U.S. PATENT DOCUMENTS

| | | | |
|---|---|---|---|
| 9,859,013 B2* | 1/2018 | Lasser | G11C 16/3418 |
| 10,692,561 B2* | 6/2020 | Jang | G11C 11/40626 |
| 2014/0089576 A1 | 3/2014 | Bains et al. | |
| 2016/0224262 A1 | 8/2016 | Mandava et al. | |
| 2020/0202921 A1 | 6/2020 | Morohashi et al. | |

OTHER PUBLICATIONS

International Search Report and Written Opinion—PCT/US2024/050206—ISA/EPO—Dec. 20, 2024.

* cited by examiner

*Primary Examiner* — Son T Dinh
(74) *Attorney, Agent, or Firm* — Norton Rose Fulbright US LLP (57) ABSTRACT

In some aspects, an apparatus includes a processing system that includes one or more processors and one or more memories coupled to the one or more processors. The processing system is configured to send one or more memory access commands to a volatile memory. The one or more memory access commands are associated with a first address. The processing system if further configured to access, based on detecting a row-hammer condition associated with the one or more memory access commands, a physically adjacent row mapping table to determine at least a second address. The first address and the second address correspond to physically adjacent rows within the volatile memory. The processing system if further configured to send one or more row refresh commands to the volatile memory based on the row-hammer condition. The one or more row refresh commands are associated with at least the second address.

14 Claims, 4 Drawing Sheets

ROW-HAMMER CONDITION MITIGATION USING A PHYSICALLY ADJACENT ROW MAPPING TABLE

TECHNICAL FIELD

Aspects of the present disclosure relate generally to memory devices and more particularly to row-hammer conditions at memory devices.

INTRODUCTION

As the value and use of information continues to increase, additional techniques to process and store data are desirable. In addition, the use of information in various locations and desired portability of information is increasing. For this reason, users are increasingly turning towards the use of portable electronic devices, such as mobile phones, digital cameras, laptop computers and the like. Portable electronic devices generally employ a memory system using a memory device for storing data. A memory system may be used as a main memory or an auxiliary memory of a portable electronic device.

The memory device of the memory system may include one kind or a combination of kinds of storage. For example, volatile memories include dynamic random access memories (DRAMs) and other types of volatile memory. As another example, magnetic-based memory systems, such as hard disk drives (HDDs), store data by encoding data as a combination of small magnets. As a further example, optical-based memory systems, such as digital versatile discs (DVDs) and Blu-ray media, store data by encoding data as physical bits that cause different reflections when illuminated by a light source.

A memory device may be susceptible to various forms of malicious attacks. One example of a malicious attack is a row-hammer attack that attempts to manipulate data in a target row by accessing a neighboring row of the target row. In a row-hammer attack, the target row may be repeatedly accessed in an attempt to manipulate data stored at the target row via electrical coupling between the target row and the neighboring row. For example, if an attacker lacks the ability to directly modify the data at the target row, the attacker may attempt to change to modify the data indirectly by repeatedly accessing the neighboring row.

Conventional approaches to protecting against row-hammer attacks may be ineffective or inefficient in some cases. To illustrate, some memory devices may select a row being accessed and may perform "dummy" reads to neighboring rows of the row being accessed to attempt to avoid data manipulation. Such a technique may be computationally complex or ineffective in some scenarios. For example, if addresses of the neighboring rows are not numerically consecutive with respect to the address of the row being accessed, then incrementing (or decrementing) the address of the row being accessed may result in addresses of rows that are non-adjacent to the row being accessed.

BRIEF SUMMARY OF SOME EXAMPLES

In some aspects of the disclosure, an apparatus includes a processing system that includes one or more processors and one or more memories coupled to the one or more processors. The processing system is configured to send one or more memory access commands to a volatile memory. The one or more memory access commands are associated with a first address. The processing system if further configured to access, based on detecting a row-hammer condition associated with the one or more memory access commands, a physically adjacent row mapping table to determine at least a second address. The first address and the second address correspond to physically adjacent rows within the volatile memory. The processing system if further configured to send one or more row refresh commands to the volatile memory based on the row-hammer condition. The one or more row refresh commands are associated with at least the second address.

In some other aspects of the disclosure, a method of operation of a device includes sending one or more memory access commands to a volatile memory. The one or more memory access commands are associated with a first address. The method further includes, based on detecting a row-hammer condition associated with the one or more memory access commands, accessing a physically adjacent row mapping table to determine at least a second address. The first address and the second address correspond to physically adjacent rows within the volatile memory. The method further includes sending one or more row refresh commands to the volatile memory based on the row-hammer condition. The one or more row refresh commands are associated with at least the second address.

In some additional aspects of the disclosure, a non-transitory computer-readable medium stores instructions executable by one or more processors to initiate, perform, or control operations. The operations include sending one or more memory access commands to a volatile memory. The one or more memory access commands are associated with a first address. The operations further include, based on detecting a row-hammer condition associated with the one or more memory access commands, accessing a physically adjacent row mapping table to determine at least a second address. The first address and the second address correspond to physically adjacent rows within the volatile memory. The operations further include sending one or more row refresh commands to the volatile memory based on the row-hammer condition. The one or more row refresh commands are associated with at least the second address.

In some further aspects of the disclosure, a memory device includes a volatile memory and a non-volatile memory. The non-volatile memory is configured to store a physically adjacent row mapping table of the volatile memory.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

Like reference numbers and designations in the various drawings indicate like elements.

DETAILED DESCRIPTION

In some aspects of the disclosure, a device may use a mapping table of physically adjacent rows to identify one or more rows of a volatile memory that are to be refreshed. To illustrate, based on detecting a row-hammer condition associated with a first address, the device may access a physically adjacent row mapping table to determine at least a second address. The first address and the second address correspond to physically adjacent rows within the volatile memory. The device may send one or more row refresh commands to the volatile memory based on the row-hammer condition. The one or more row refresh commands may indicate at least the second address.

In some examples, the device may store the physically adjacent row mapping table at a non-volatile memory (NVM) and may copy the physically adjacent row mapping table (or a portion of the physically adjacent row mapping table) into a local memory for dynamic access during operation (e.g., upon detecting the row-hammer condition). Further, in some examples, the device may retrieve the physically adjacent row mapping table from the NVM in accordance with a security protocol. The security protocol may include one or more of a replay protected memory block (RPMB) security protocol or a replay protection monotonic counter (RPMC) security protocol, as illustrative examples.

In some implementations, architecture of the volatile memory may be leveraged in order to reduce a data size of the physically adjacent row mapping table. For example, neighboring row addresses may be associated with a common set of bits, such as a particular quantity of most significant bits (MSBs). The common set of bits may be excluded from at least some addresses indicated by the physically adjacent row mapping table to decrease the data size of the physically adjacent row mapping table. As a result, by excluding such a common set of bits from at least some addresses, storage space and device resources used to store and access the physically adjacent row mapping table may be decreased.

One or more features described herein may improve security and reliability of a device that includes a volatile memory. For example, use of the physically adjacent row mapping table may enable the device to quickly and accurately identify one or more neighboring rows of a row that is being accessed (and that is potentially subject to a row-hammer attack) and to refresh the one or more neighboring rows. As a result, data security and reliability may be increased as compared to other techniques, such as a technique that "guesses" at the addresses of neighboring rows (e.g., by incrementing or decrementing the address of the row being accessed), which may lead to one or more incorrect rows being refreshed in the case of non-consecutive addresses and which may potentially jeopardize data security and reliability.

Figure 1:
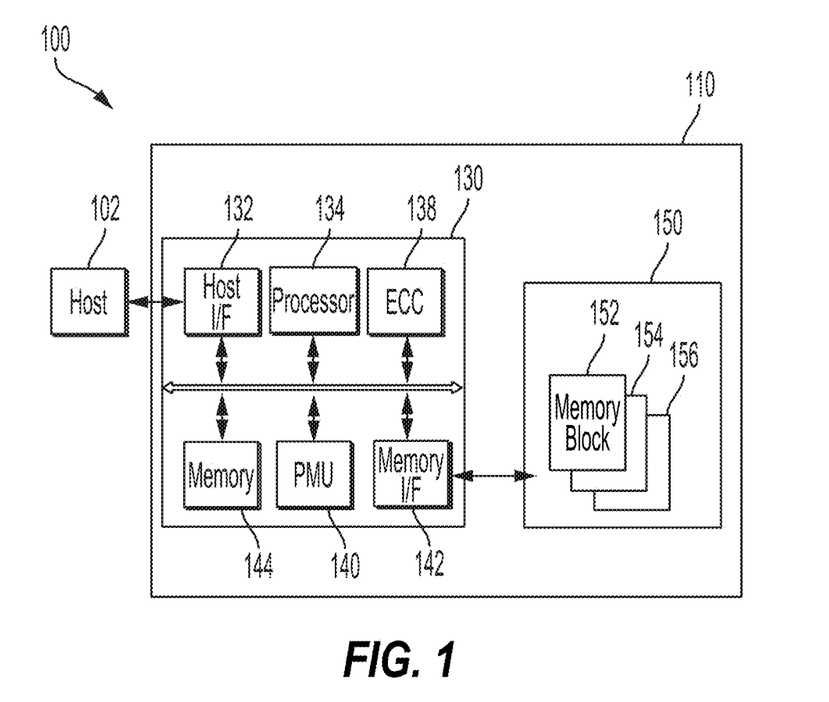
FIG. 1 is a block diagram illustrating a data processing system including a memory system according to some aspects of the disclosure.

To further illustrate, one or more features described herein may be used in a computing system, such as is illustrated in the example of FIG. 1. FIG. 1 illustrates a data processing system 100, such as may be included in a mobile computing device, according to one or more aspects of the disclosure. A memory system 110 may couple to a host device 102 through one or more channels. For example, the host device 102 and memory system 110 may be coupled through a serial interface including a single channel for the transport of data or a parallel interface including two or more channels for the transport of data. In some aspects, control data may be transferred through the same channel(s) as the data or the control data may be transferred through additional channels. The host device 102 may be, for example, a portable electronic device such as a mobile phone, an MP3 player, a laptop computer, or a non-portable electronic device such as a desktop computer, a game player, a television (TV), a media player, or a projector. As another example, the host device 102 may be an automotive computer system. In some examples, the memory system 110 may be included in the host device 102. Thus, the data processing system 100 may be any of the example host devices described herein including the memory system 110. Additional example host devices are illustrated and described with reference to FIG. 6.

The memory system 110 may execute operations in response to commands (e.g., a request) from the host device 102. For example, the memory system 110 may store data provided by the host device 102 and the memory system 110 may also provide stored data to the host device 102. The memory system 110 may be used as a main memory, short-term memory, or long-term memory by the host device 102. As one example of main memory, the host device 102 may use the memory system 110 to supplement or replace a system memory by using the memory system 110 to store temporary data such as data relating to operating systems and/or threads executing in the operation system. As one example of short-term memory, the host device 102 may use the memory system 110 to store a page file for an operating system. As one example of long-term memory, the host device 102 may use the memory system 110 to store user files (e.g., documents, videos, pictures) and/or application files (e.g., word processing executable, gaming application).

The memory system 110 may be implemented with any one of various storage devices, according to the protocol of a host interface for the one or more channels coupling the memory system 110 to the host device 102. The memory system 110 may be implemented with any one of various storage devices, such as a volatile memory, a non-volatile memory (NVM), a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, or a memory stick.

The memory system 110 may include a memory module 150 and a controller 130 coupled to the memory module 150 through one or more channels. The memory module 150 may store and retrieve data in memory blocks 152, 154, and 156 under control of the controller 130, which may execute commands received from the host device 102. The controller 130 is configured to control data exchange between the memory module 150 and the host device 102. The storage components, such as blocks 152, 154, and 156 in the memory module 150 may be implemented as volatile memory device, such as a dynamic random access memory (DRAM) or a static random access memory (SRAM), or a non-volatile memory device, such as a read only memory (ROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (SCRAM), or a NAND flash memory.

The controller 130 and the memory module 150 may be formed as integrated circuits on one or more semiconductor dies (or other substrate). In some aspects, the controller 130 and the memory module 150 may be integrated into one chip. In some aspects, the memory module 150 may include one or more chips coupled in series or parallel with each other and coupled to the controller 130, which is on a separate chip. In some aspects, the memory module 150 and controller 130 chips are integrated in a single package, such as in a package on package (PoP) system. In some aspects, the memory system 110 is integrated on a single chip with one or more or all of the components (e.g., application processor, system memory, digital signal processor, modem, graphics processor, memory interface, input/output interface, network adaptor) of the host device 102, such as in a system on chip (SoC). The controller 130 and the memory module 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The controller 130 of the memory system 110 may control the memory module 150 in response to commands from the host device 102. The controller 130 may execute read commands to provide the data from the memory module 150 to the host device 102. The controller 130 may execute write commands to store data provided from the host device 102 into the memory module 150. The controller 130 may execute other commands to manage data in the memory module 150, such as program and erase commands. The controller 130 may also execute other commands to manage control of the memory system 110, such as setting configuration registers of the memory system 110. By executing commands in accordance with the configuration specified in the configuration registers, the controller 130 may control operations of the memory module 150, such as read, write, program, and erase operations.

The controller 130 may include several components configured for performing the received commands. For example, the controller 130 may include a host interface (I/F) 132, a processor 134, an error correction code (ECC) engine 138, a power management unit (PMU) 140, a memory interface (I/F) 142, and/or a memory 144. The PMU 140 may provide and manage power for components within the controller 130 and/or the memory module 150.

The host I/F 132 may process commands and data provided from the host device 102, and may communicate with the host device 102, through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE). For example, the host I/F 132 may be a parallel interface such as an MMC interface, or a serial interface such as an ultra-high speed class 1 (UHS-I)/UHS class 2 (UHS-II) or a universal flash storage (UFS) interface.

The ECC engine 138 may detect and correct errors in the data read from the memory module 150 during the read operation. The ECC engine 138 may not correct error bits when the number of the error bits is greater than a threshold number of correctable error bits, which may result in the ECC engine 138 outputting an error correction fail signal indicating failure in correcting the error bits. In some aspects, no ECC engine 138 may be provided or the ECC engine 138 may be configurable to be active for some or all of the memory module 150. The ECC engine 138 may perform an error correction operation using a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM).

The memory I/F 142 provides an interface between the controller 130 and the memory module 150 to allow the controller 130 to control the memory module 150 in response to a commands received from the host device 102. The memory I/F 142 may generate control signals for the memory module 150, such as signals for rowlines and bitlines, and process data under the control of the processor 134.

The memory 144 may serve as a working memory of the memory system 110 and the controller 130. The memory 144 may store data for driving the memory system 110 and the controller 130. When the controller 130 controls an operation of the memory module 150 such as, for example, a read, write, program or erase operation, the memory 144 may store data which are used by the controller 130 and the memory module 150 for the operation. The memory 144 may be implemented with a volatile memory such as, for example, a static random access memory (SRAM) or a dynamic random access memory (DRAM). In some aspects, the memory 144 may store address mappings, a program memory, a data memory, a write buffer, a read buffer, a map buffer, and the like.

The processor 134 may control the general operations of the memory system 110, and a write operation or a read operation for the memory module 150, in response to a write request or a read request received from the host device 102, respectively. For example, the processor 134 may execute firmware to control the general operations of the memory system 110. The processor 134 may be implemented, for example, with a microprocessor or a central processing unit (CPU), or an application-specific integrated circuit (ASIC).

Figure 2:
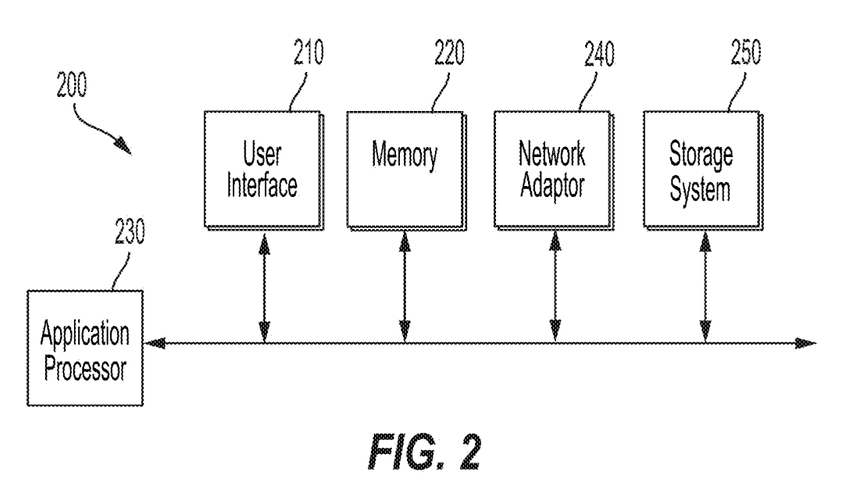
FIG. 2 is a block diagram illustrating an example electronic device that may include the memory system of FIG. 1 according to some aspects of the disclosure.

FIG. 2 is a block diagram illustrating an example electronic device that may include the memory system 110 according to one or more aspects of the disclosure. The electronic device 200 may include a user interface 210, a memory 220, an application processor 230, a network adaptor 240, and a storage system 250 (which may be one implementation of the memory system 110 of FIG. 1). The application processor 230 may be coupled to the other components through a bus, such as a peripheral component interface (PCI) bus, including a PCI express (PCIe) bus.

The application processor 230 may execute computer program code, including applications, drivers, and operating systems, to coordinate performing of tasks by components included in the electronic device 200. For example, the application processor 230 may execute a storage driver for accessing the storage system 250. The application processor 230 may be part of a system-on-chip (SoC) that includes one or more other components shown in electronic device 200.

The memory 220 may operate as a main memory, a working memory, a buffer memory or a cache memory of the electronic device 200. The memory 220 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM, an LPDDR3 SDRAM, an LPDDR4 SDRAM, an LPDDR5 SDRAM, or an LPDDR6 SDRAM, or a nonvolatile random access memory such as a phase change random access memory (PRAM), a resistive random access memory (ReRAM), a magnetic random access memory (MRAM) and a ferroelectric random access memory (FRAM). In some aspects, the application processor 230 and the memory 220 may be combined using a package-on-package (POP).

The network adaptor 240 may communicate with external devices. For example, the network adaptor 240 may support wired communications and/or various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (Wi-Di), and so on, and may thereby communicate with wired and/or wireless electronic appliances, for example, a mobile electronic appliance.

The storage system 250 may store data, for example, data received from the application processor 230, and transmit data stored therein, to the application processor 230. The storage system 250 may be a non-volatile semiconductor memory device, such as a phase-change RAM (PRAM), a magnetic RAM (MRAM), a resistive RAM (ReRAM), a NAND flash memory, a NOR flash memory, or a 3-dimensional (3-D) NAND flash memory. The storage system 250 may be a removable storage medium, such as a memory card or an external drive. For example, the storage system 250 may correspond to the memory system 110 described above with reference to FIG. 1 and may be a SSD, eMMC, UFS, or other memory system.

The user interface 210 provide one or more graphical user interfaces (GUIs) for inputting data or commands to the application processor 230 or for outputting data to an external device. For example, the user interface 210 may include user input interfaces, such as a virtual keyboard, a touch screen, a camera, a microphone, a gyroscope sensor, or a vibration sensor, and user output interfaces, such as a liquid crystal display (LCD), an organic light emitting diode (OLED) display device, an active matrix OLED (AMOLED) display device, a light emitting diode (LED), a speaker, or a haptic motor.

Figure 3:
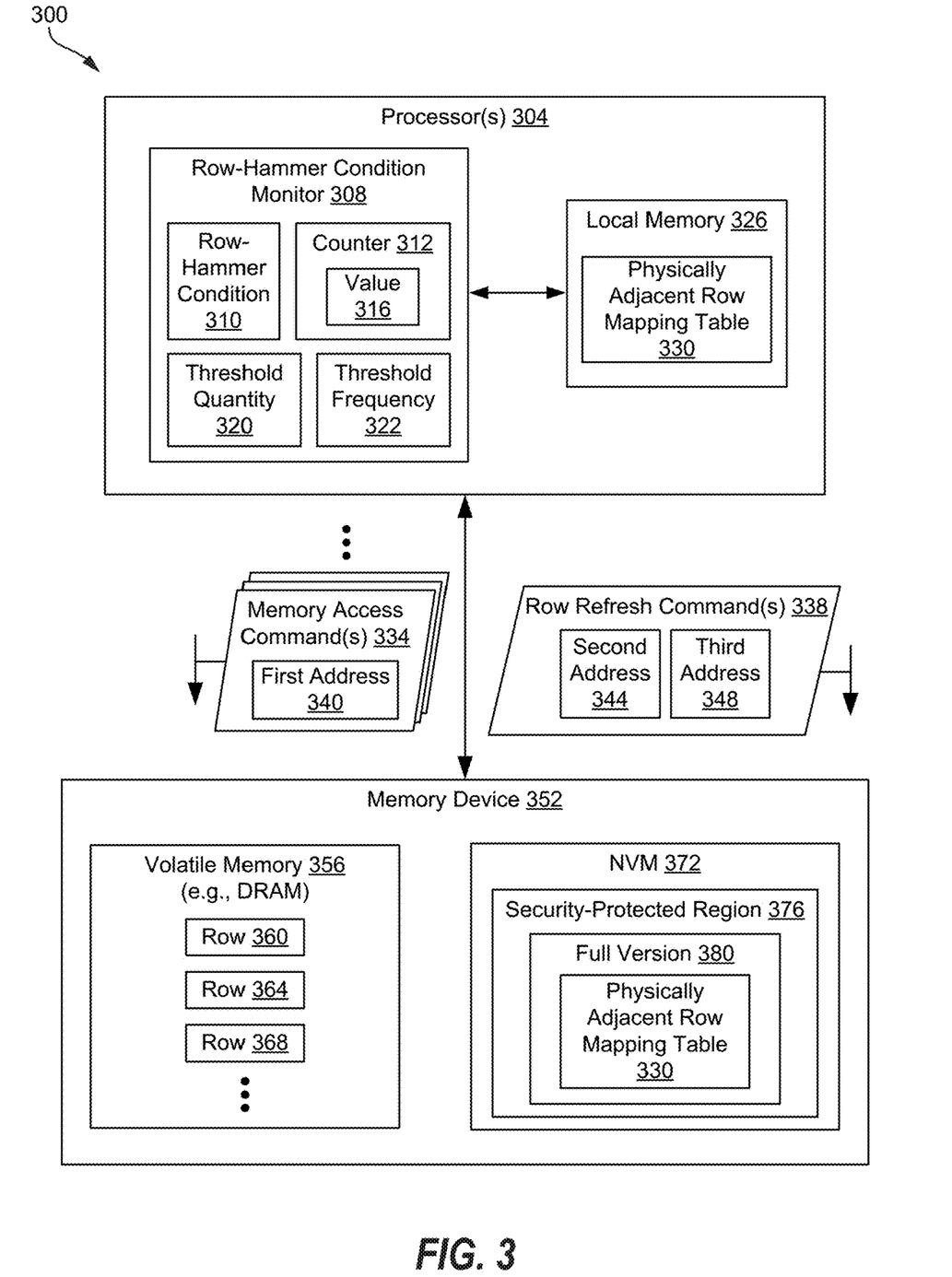
FIG. 3 is a block diagram illustrating an example of a system according to some aspects of the disclosure.

FIG. 3 is a block diagram illustrating an example of a device 300 according to some aspects of the disclosure. The device 300 includes one or more processors 304 coupled to a memory device 352. The one or more processors 304 may individually or collectively initiate, perform, or control one or more operations described herein.

The one or more processors 304 may include (or may execute) a row-hammer condition monitor 308. The row-hammer condition monitor 308 may include (or may execute) a counter 312. The one or more processors 304 may further include or may be coupled to a local memory 326, such as a cache or other memory. The local memory 326 may be coupled to the row-hammer condition monitor 308. Although the example of FIG. 3 illustrates that the one or more processors 304 may include the local memory 326, in some other examples, the local memory 326 may be external to the one or more processors 304.

The memory device 352 may include a volatile memory 356, such as a dynamic random access memory (DRAM). The volatile memory 356 may include multiple rows of storage elements, such as rows 360, 364, and 368. The memory device 352 may further include or may be coupled to a non-volatile memory (NVM) 372 having a security-protected region 376.

In some implementations, one or more features described with reference to FIG. 3 may correspond to one or more features described with reference to FIG. 1, FIG. 2, or both. To illustrate, in some implementations, the one or more processors 304 may be included in a host device. For example, one or more processors 304 may be included in the host device 102, may include or correspond to the application processor 230, or both. In such examples, the memory device 352 may include a memory controller (such as the controller 130) that communicates with the one or more processors 304. In some other examples, the one or more processors 304 may be included in such a memory controller, such as the controller 130. For example, the one or more processors 304 may include or correspond to the processor 134. In some examples, the local memory 326 may correspond to the memory 144, the memory 220, or another memory. Further, in some implementations, the memory device 352 may include or correspond to any of the memory module 150, the memory 220, or the storage system 250. In some examples, the one or more processors 304 and the memory device 352 may be included in a system on chip (SoC).

During operation, the processors 304 may initiate memory operations to the memory device 352. For example, the one or more processors 304 may receive requests (e.g., from a program executed by the one or more processors 304 or by another processor) to read data from the memory device 352, to write data to the memory device 352, or to erase or invalidate data from the memory device 352. To further illustrate, the one or more processors 304 may receive one or more requests to perform one or more memory operations associated with a first address 340. The first address 340 may be associated with a row of the volatile memory 356, such as one of the rows 360, 364, and 368. The one or more processors 304 may send one or more memory access commands 334 to the volatile memory 356 based on the one or more requests.

The row-hammer condition monitor 308 may monitor such memory operations to detect a row-hammer condition 310. In some examples, the row-hammer condition 310 may correspond to an operational state of the device 300, or sequence of operational states of the device 300, that is indicative of a row-hammer attack. For example, a relatively large quantity of accesses to a row, or relatively frequent accesses to the row, may indicate that the row is a likely or potential target of a row-hammer attack (such as a row-hammer attack that attempts to repeatedly write to the row in an attempt to use electrical coupling to manipulate data in a neighbor row). In such examples, the row-hammer condition monitor 308 may detect the row-hammer condition 310 based on a determination that the row is subject to a relatively large quantity of accesses or relatively frequent accesses.

To further illustrate, the row-hammer condition monitor 308 may detect the row-hammer condition 310 based on determining that a quantity of the one or more memory access commands 334 exceeds a threshold quantity 320. The threshold quantity 320 may correspond to a particular quantity of memory accesses (e.g., a large quantity of memory accesses) indicating a likely or potential row-hammer attack. Alternatively, or in addition, the row-hammer condition monitor 308 may detect the row-hammer condition 310 based on determining that a frequency associated with the one or more memory access commands 334 exceeds a threshold frequency 322. The threshold frequency 322 may correspond to a particular frequency of memory accesses (e.g., a relatively large frequency of memory accesses) indicating a likely or potential row-hammer attack.

To further illustrate, in some implementations, the row-hammer condition monitor 308 may increment, for each memory access command of the one or more memory access commands 334, a value 316 of the counter 312. In this case, the value 316 may represent a quantity of accesses associated with the first address 340. To illustrate, in some examples, the value 316 may be relatively small, which may not indicate a likely or potential row-hammer attack. In such examples, the row-hammer condition monitor 308 may not detect the row-hammer condition 310 (due to the value 316 being relatively small, which may indicate that a row-hammer attack is unlikely). In some other examples, the value 316 may be relatively large, which may indicate a likely or potential row-hammer attack. In such examples, the row-hammer condition monitor 308 may detect the row-hammer condition 310 based on determining that the value 316 exceeds the threshold quantity 320 (which may indicate a likely or potential row-hammer attack). Further, other examples are also within the scope of the disclosure. For example, in other implementations, the value 316 may represent another metric or other information, such as an address or index associated with a row that is subject to a likely or potential row-hammer attack.

Based on detecting the row-hammer condition 310, the one or more processors 304 may access a physically adjacent row mapping table 330 (e.g., at the local memory 326) to determine one or both of a second address 344 or a third address 348. To illustrate, in some examples, the first address 340, the second address 344, and the third address 348 may be logical addresses that are associated with the row 364, the row 360, and the row 368, respectively, of the volatile memory 356. The row 360 and the row 368 are physically adjacent to the row 364. For example, the row 364 may be associated with an index value of n, the row 360 may be associated with an index value of n−1, and the row 368 may be associated with an index value of n+1, where n indicates a positive integer greater than zero.

Although the row 360 and the row 368 may be physically adjacent to the row 364, in some examples, the first address 340, the second address 344, and the third address 348 may be non-adjacent to one another. For example, the first address 340 may be a first logical address in a logical address space, and the second address 344 may be a second logical address that is non-adjacent to the first logical address in the logical address space, and the third address 348 may be a third logical address that is non-adjacent to the first logical address in the logical address space. In such examples, logically adjacent addresses in the logical address space may not map to physically adjacent rows within the volatile memory 356.

The one or more processors 304 may send one or more row refresh commands 338 to the volatile memory 356 based on detecting the row-hammer condition 310 associated with the first address 340. The one or more row refresh commands 338 may indicate that one or more adjacent rows of a row corresponding to the first address 340 are to be refreshed. For example, the first address 340 may correspond to the row 364, and the one or more row refresh commands 338 may indicate one or more of the second address 344 or the third address 348, which may correspond to the row 360 and the row 368, respectively. In some implementations, the one or more row refresh commands 338 may further indicate the first address 340. In such implementations, if the row 364 corresponds to the first address 340, then the one or more row refresh commands 338 may indicate that the row 364 is to be refreshed (in addition to refreshing the row 360 and the row 368).

In some examples, the one or more processors 304 may load the physically adjacent row mapping table 330 to the local memory from another storage location, such as a from the NVM 372. In some examples, the one or more processors 304 may load the physically adjacent row mapping table 330 to the local memory from a particular region of the NVM 372. The particular region may be reserved for storing the physically adjacent row mapping table 330. In some examples, the particular region may correspond to or may include the security-protected region 376.

Further, in some examples, the one or more processors 304 may comply with a security protocol to access the physically adjacent row mapping table 330 at the NVM 372. In such examples, the one or more processors 304 may load the physically adjacent row mapping table 330 to the local memory from the particular region of the NVM 372 based on a security protocol. The security protocol may include one or more of a replay protected memory block (RPMB) security protocol or a replay protection monotonic counter (RPMC) security protocol, as illustrative examples.

In some implementations, the physically adjacent row mapping table 330 stored at the local memory 326 may correspond to a copy of the physically adjacent row mapping table 330 stored at the particular region of the NVM 372. In some other implementations, the physically adjacent row mapping table 330 stored at the local memory 326 may correspond to a subset of a full version 380 of the physically adjacent row mapping table 330 stored at the particular region of the NVM 372. In such examples, the one or more processors 304 may load less than all of the full version 380 of the physically adjacent row mapping table 330 from the particular region of the NVM 372 to the local memory 326.

Figure 4:
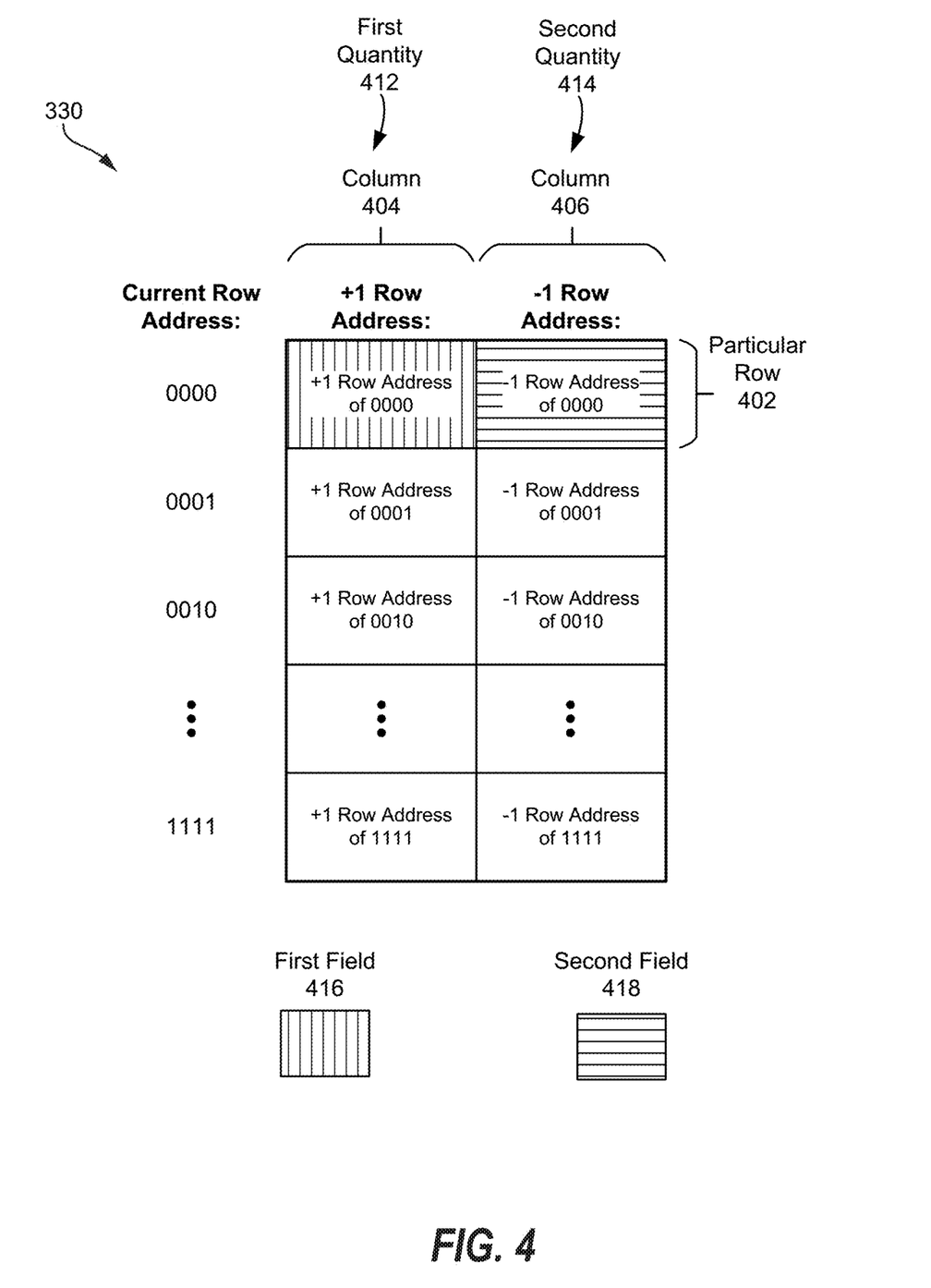
FIG. 4 is a diagram illustrating an example of a physically adjacent row mapping table according to some aspects of the disclosure.

FIG. 4 is a diagram illustrating an example of the physically adjacent row mapping table 330 according to some aspects of the disclosure. In the example of FIG. 4, the physically adjacent row mapping table 330 may include a column 404 indicating +1 row addresses and may further include a column 406 indicating −1 row addresses.

To further illustrate, in the example of FIG. 4, a particular row 402 of the physically adjacent row mapping table 330 may be associated with a current row address 0000. In the particular row 402, the column 404 may indicate a +1 row address of the current row address 0000, and the column 406 may indicate the −1 row address of the current row address 0000. In some examples, the particular row 402 may include a first field 416 (e.g., within the column 404) and a second field 418 (e.g., within the column 406). The first field 416 may indicate the second address 344 of FIG. 3, and the second field 418 may indicate the third address 348 of FIG. 3.

In some examples, the physically adjacent row mapping table 330 may have a lookup table (LUT) format. The particular row 402 may be indexed within the physically adjacent row mapping table 330 based on the first address 340 of FIG. 3. In such examples, to identify the second address 344 and the third address 348 based on the first address 340, the first address 340 may be input to the physically adjacent row mapping table 330 (e.g., as an index to the LUT). Inputting the first address 340 may return the second address 344 and the third address 348.

In some implementations, a compression scheme may be used to reduce an amount of bits used to represent an address, such as a +1 row address or a −1 row address. For example, neighboring or nearby row addresses may be associated with a common set of bits, such as a particular quantity of most significant bits (MSBs). In such examples, one of the +1 row address and the −1 row address may include the set of bits, and the other of the +1 row address and the −1 row address may exclude the set of bits.

To illustrate, the first field 416 may be associated with a first quantity 412 of bits used to represent the second address 344, and the second field 418 may be associated with a second quantity 414 of bits used to represent the third address 348, where the second quantity 414 of bits is different than the first quantity 412 of bits. As an illustrative non-limiting example, in some implementations, the first quantity 412 may be eighteen bits, and the second quantity 414 may be fourteen bits. In such examples, the second address 344 and the third address 348 may include a common set of four bits (e.g., MSBs), and the common set of four bits may be omitted from either the second address 344 or the third address 348 within the physically adjacent row mapping table 330. As a result, a data size of the physically adjacent row mapping table 330 may be reduced as compared to some other techniques, such as a technique in which the first quantity 412 is equal to the second quantity 414 (e.g., where eighteen bits are allocated to each of the second address 344 and the third address 348). Other examples are also within the scope of the disclosure.

In some other examples, a common set of bits (e.g., a common set of MSBs) may be omitted from the current row address, the +1 row address, and the −1 row address. To illustrate, in some examples, each field illustrated in FIG. 4 may include a particular quantity of least significant bits (LSBs) selected from a larger group of bits. For example, in FIG. 4, each field may include four LSBs selected from a larger group of bits that includes N >4 bits, such as N=14. In such examples, the first quantity 412 may be equal to the second quantity 414. As a result, a data size of the physically adjacent row mapping table 330 may be reduced as compared to some other techniques, such as a technique in which eighteen bits are allocated to each of the second address 344 and the third address 348. Other examples are also within the scope of the disclosure.

In some examples, the value of N may be stored at a particular storage location. The particular storage location may correspond to a mode register (e.g., a mode register of the volatile memory 356, such as a DRAM mode register), in an NVM (e.g., the NVM 372), in a memory controller (e.g., within a read-only memory (ROM) of the memory controller), or in a fuse bank, as illustrative examples. The particular storage location may be accessible to the one or more processors 304. Further, in some examples, the value of N may be selectable from a range of values that is defined by a maximum value, which may be stored at the particular storage location or at another storage location.

Although certain examples are provided herein for illustration, those of skill in the art will recognize that other examples are also within the scope of the disclosure. For example, although some examples are described with reference to refreshing two rows based on detection of a row-hammer condition, in other examples, a different quantity of rows may be refreshed. As an illustrative example, in some implementations, based on detecting a row-hammer condition with a particular row, one adjacent row to the particular row may be refreshed, such as by refreshing either a +1 row address or a −1 row address. In such examples, the one or more row refresh commands 338 may indicate one of the second address 344 or the third address 348 (e.g., without indicating both the second address 344 or the third address 348). In another example, more than two row addresses may be refreshed. For example, the one or more row refresh commands 338 may indicate a +1 row address, a −1 row address, a +2 row address, and a −2 row address. Other examples are also within the scope of the disclosure.

One or more features described herein may improve security and reliability of a device (e.g., the device 300) that includes a volatile memory (e.g., the volatile memory 356). For example, use of the physically adjacent row mapping table 330 may enable the device 300 to quickly and accurately identify one or more neighboring rows (such as the rows 360, 368) of a row being accessed (such as the row 364) and to refresh the one or more neighboring rows. As a result, data security and reliability may be increased as compared to other techniques, such as a technique that "guesses" at the addresses 344, 348 (e.g., by incrementing or decrementing the first address 340), which may lead to one or more incorrect rows being refreshed in the case of non-consecutive addresses and which may potentially jeopardize data security and reliability.

Figure 5:
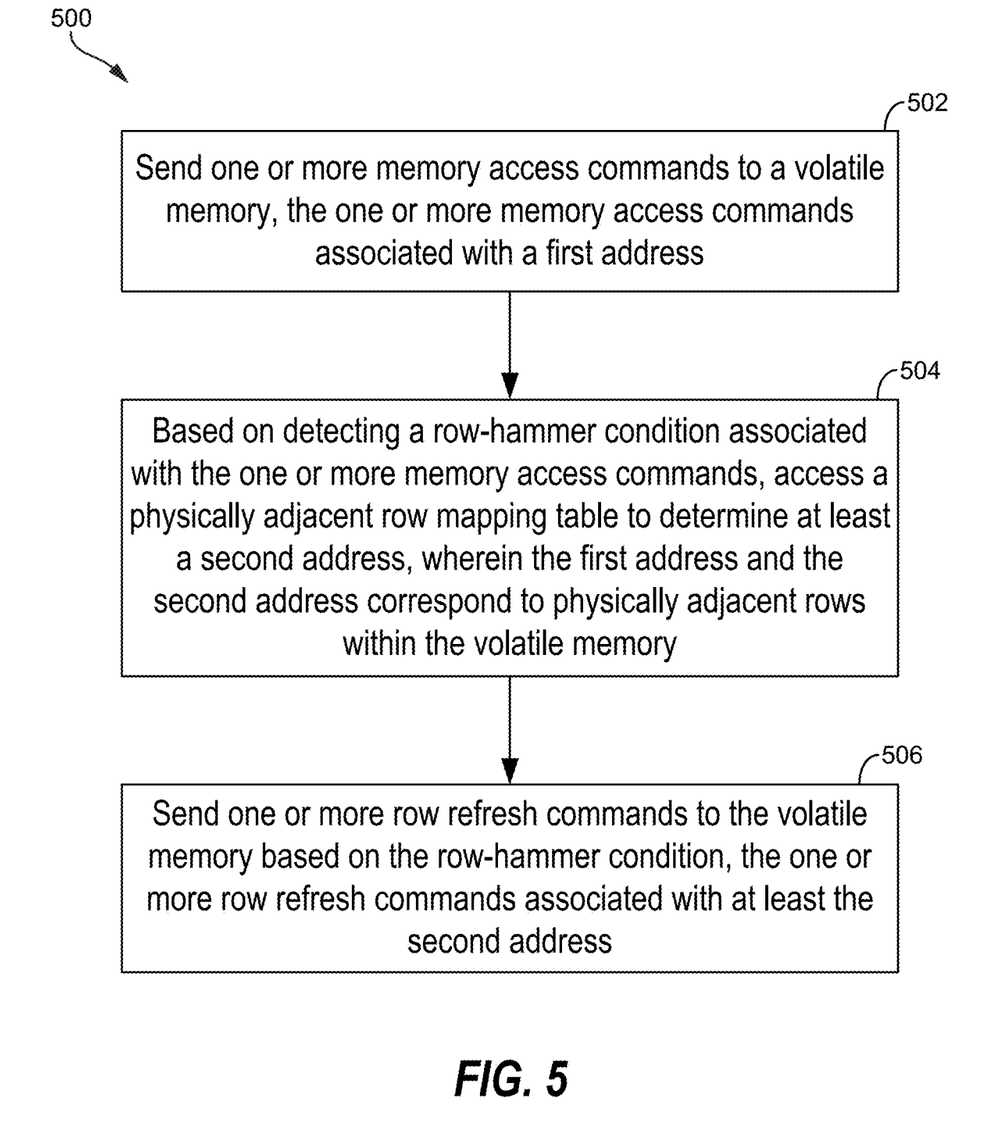
FIG. 5 is flow chart illustrating a method of operation of a device according to some aspects of the disclosure.

FIG. 5 is flow chart illustrating a method 500 of operation of a device according to some aspects of the disclosure. Depending on the particular implementation, the method 500 may be performed by any of the host device 102, the controller 130, the processor 134, the application processor 230, the one or more processors 304, or another device.

The method 500 includes sending one or more memory access commands to a volatile memory, at 502. The one or more memory access commands are associated with a first address. For example, the one or more processors 304 may send the one or more memory access commands 334 to the volatile memory 356, and the one or more memory access commands 334 may be associated with the first address 340.

The method 500 further includes, based on detecting a row-hammer condition associated with the one or more memory access commands, accessing a physically adjacent row mapping table to determine at least a second address, at 504. The first address and the second address correspond to physically adjacent rows within the volatile memory. For example, based on detecting the row-hammer condition 310 associated with the one or more memory access commands 334, the one or more processors 304 may access the physically adjacent row mapping table 330 to determine at least the second address 344. The first address 340 and the second address 344 may correspond to physically adjacent rows within the volatile memory 356, such as the rows 360 and 364, or the rows 364 and 368, as illustrative examples.

The method 500 further includes sending one or more row refresh commands to the volatile memory based on the row-hammer condition, at 506. The one or more row refresh commands are associated with at least the second address. For example, upon accessing the physically adjacent row mapping table 330 to determine at least the second address 344, the one or more processors 304 may send the one or more row refresh commands 338 to the volatile memory 356. The one or more row refresh commands may be associated with at least the second address 344.

In a first aspect, an apparatus includes a processing system that includes one or more processors and one or more memories coupled to the one or more processors. The processing system is configured to send one or more memory access commands to a volatile memory. The one or more memory access commands are associated with a first address. The processing system if further configured to access, based on detecting a row-hammer condition associated with the one or more memory access commands, a physically adjacent row mapping table to determine at least a second address. The first address and the second address correspond to physically adjacent rows within the volatile memory. The processing system if further configured to send one or more row refresh commands to the volatile memory based on the row-hammer condition. The one or more row refresh commands are associated with at least the second address.

In a second aspect, in combination with the first aspect, the processing system is further configured to load the physically adjacent row mapping table from a particular region of a non-volatile memory (NVM) to a local memory based on a security protocol and to access the physically adjacent row mapping table from the local memory to determine the second address.

In a third aspect, in combination with one or more of the first aspect or the second aspect, the particular region of the NVM is reserved for storing the physically adjacent row mapping table.

In a fourth aspect, in combination with one or more of the first aspect through the third aspect, the physically adjacent row mapping table stored at the local memory corresponds to a copy of the physically adjacent row mapping table stored at the particular region of the NVM.

In a fifth aspect, in combination with one or more of the first aspect through the fourth aspect, the physically adjacent row mapping table stored at the local memory corresponds to a subset of a full version of the physically adjacent row mapping table stored at the particular region of the NVM.

In a sixth aspect, in combination with one or more of the first aspect through the fifth aspect, the security protocol includes one or more of a replay protected memory block (RPMB) security protocol or a replay protection monotonic counter (RPMC) security protocol.

In a seventh aspect, a method of operation of a device includes sending one or more memory access commands to a volatile memory. The one or more memory access commands are associated with a first address. The method further includes, based on detecting a row-hammer condition associated with the one or more memory access commands, accessing a physically adjacent row mapping table to determine at least a second address. The first address and the second address correspond to physically adjacent rows within the volatile memory. The method further includes sending one or more row refresh commands to the volatile memory based on the row-hammer condition. The one or more row refresh commands are associated with at least the second address.

In an eighth aspect, in combination with the seventh aspect, the physically adjacent row mapping table indicates that the first address is associated with the second address and with a third address, and the first address, the second address, and the third address correspond to the physically adjacent rows within the volatile memory.

In a ninth aspect, in combination with one or more of the seventh aspect through the eighth aspect, a particular row of the physically adjacent row mapping table includes a first field and a second field, the first field indicates the second address, and the second field indicates the third address.

In a tenth aspect, in combination with one or more of the seventh aspect through the ninth aspect, the physically adjacent row mapping table has a lookup table (LUT) format, and the particular row is indexed within the physically adjacent row mapping table based on the first address.

In an eleventh aspect, in combination with one or more of the seventh aspect through the tenth aspect, the first field is associated with a first quantity of bits used to represent the second address, and the second field is associated with a second quantity of bits used to represent the third address. The second quantity of bits is different than the first quantity of bits.

In a twelfth aspect, in combination with one or more of the seventh aspect through the eleventh aspect, the first field is associated with a first quantity of bits used to represent the second address, and the second field is associated with a second quantity of bits used to represent the third address. The second quantity of bits is equal to the first quantity of bits.

In a thirteenth aspect, in combination with one or more of the seventh aspect through the twelfth aspect, the first address is a first logical address in a logical address space, and the second address is a second logical address that is non-adjacent to the first logical address in the logical address space.

In a fourteenth aspect, in combination with one or more of the seventh aspect through the thirteenth aspect, detecting the row-hammer condition includes one or more of determining that a quantity of the one or more memory access commands exceeds a threshold quantity or determining that a frequency associated with the one or more memory access commands exceeds a threshold frequency.

In a fifteenth aspect, a non-transitory computer-readable medium stores instructions executable by one or more processors to initiate, perform, or control operations. The operations include sending one or more memory access commands to a volatile memory.

The one or more memory access commands are associated with a first address. The operations further include, based on detecting a row-hammer condition associated with the one or more memory access commands, accessing a physically adjacent row mapping table to determine at least a second address. The first address and the second address correspond to physically adjacent rows within the volatile memory. The operations further include sending one or more row refresh commands to the volatile memory based on the row-hammer condition. The one or more row refresh commands are associated with at least the second address.

In a sixteenth aspect, in combination with the fifteenth aspect, the operations further include loading the physically adjacent row mapping table from a particular region of a non-volatile memory (NVM) to a local memory based on a security protocol and accessing the physically adjacent row mapping table from the local memory to determine the second address.

In a seventeenth aspect, in combination with one or more of the fifteenth aspect through the sixteenth aspect, the particular region of the NVM is reserved for storing the physically adjacent row mapping table.

In an eighteenth aspect, in combination with one or more of the fifteenth aspect through the seventeenth aspect, the physically adjacent row mapping table stored at the local memory corresponds to a copy of the physically adjacent row mapping table stored at the particular region of the NVM.

In a nineteenth aspect, in combination with one or more of the fifteenth aspect through the eighteenth aspect, the physically adjacent row mapping table stored at the local memory corresponds to a subset of a full version of the physically adjacent row mapping table stored at the particular region of the NVM.

In a twentieth aspect, in combination with one or more of the fifteenth aspect through the nineteenth aspect, the security protocol includes one or more of a replay protected memory block (RPMB) security protocol or a replay protection monotonic counter (RPMC) security protocol.

In a twenty-first aspect, a memory device includes a volatile memory and a non-volatile memory. The non-volatile memory is configured to store a physically adjacent row mapping table of the volatile memory.

In a twenty-second aspect, in combination with the twenty-first aspect, the non-volatile memory includes a particular region configured to store the physically adjacent row mapping table in accordance with a security protocol.

In a twenty-third aspect, in combination with one or more of the twenty-first aspect through the twenty-second aspect, the security protocol includes one or more of a replay protected memory block (RPMB) security protocol or a replay protection monotonic counter (RPMC) security protocol.

In a twenty-fourth aspect, in combination with one or more of the twenty-first aspect through the twenty-third aspect, the physically adjacent row mapping table has a lookup table (LUT) format, and a particular row of the physically adjacent row mapping table is indexed by a first address in accordance with the LUT format.

In a twenty-fifth aspect, in combination with one or more of the twenty-first aspect through the twenty-fourth aspect, the first address is associated with a first row of the volatile memory, and the particular row of the physically adjacent row mapping table indicates that a second address and a third address are each physically adjacent to the first row within the volatile memory.

In a twenty-sixth aspect, in combination with one or more of the twenty-first aspect through the twenty-fifth aspect, the first address is a first logical address in a logical address space, the second address is a second logical address that is non-adjacent to the first logical address in the logical address space, and the third address is a third logical address that is non-adjacent to the first logical address in the logical address space.

While aspects and implementations are described in this application by illustration to some examples, those skilled in the art will understand that additional implementations and use cases may come about in many different arrangements and scenarios. For example, one or more features described herein may be implemented using different platform types, devices, systems, shapes, sizes, and packaging arrangements. To illustrate, one or more features may be implemented using integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some settings, devices incorporating described aspects and features may also include additional components and features for implementation and practice of claimed and described aspects. It is intended that innovations described herein may be practiced in a variety of implementations, including both large devices or small devices, chip-level components, multi-component systems (e.g., radio frequency (RF)-chain, communication interface, processor), distributed arrangements, end-user devices, etc. of varying sizes, shapes, and constitution.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via processor circuitry, via executable instructions, or combinations thereof.

One or more illustrative logics, logical blocks, modules, circuits, methods, and processes described herein may be implemented using electronic hardware, computer software, or combinations of both. Whether such functionality is implemented in hardware or software may depend upon the particular application and design of the overall system.

The hardware and data processing apparatus used to implement the various illustrative logics, logical blocks, modules and circuits described in connection with the aspects disclosed herein may be implemented or performed with a single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be or may include a microprocessor, controller, microcontroller, or state machine, as illustrative examples. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, one or more functions described herein may be implemented in hardware, digital electronic circuitry, computer software, firmware, including the structures disclosed in this specification and their structural equivalents thereof, or in any combination thereof. One or more features described herein also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The operations of a method or process disclosed herein may be implemented in a processor-executable software module which may reside on a computer-readable medium. Computer-readable media includes computer storage media. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and "back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:
a processing system that includes one or more processors and one or more memories coupled to the one or more processors, the processing system configured to:

send one or more memory access commands to a volatile memory, the one or more memory access commands associated with a first address;

based on detecting a row-hammer condition associated with the one or more memory access commands, access a physically adjacent row mapping table to determine at least a second address, wherein the first address and the second address correspond to physically adjacent rows within the volatile memory; and send one or more row refresh commands to the volatile memory based on the row-hammer condition, the one or more row refresh commands associated with at least the second address.

2. The apparatus of claim 1, wherein the processing system is further configured to:

load the physically adjacent row mapping table from a particular region of a non-volatile memory (NVM) to a local memory based on a security protocol; and access the physically adjacent row mapping table from the local memory to determine the second address.

3. The apparatus of claim 2, wherein the particular region of the NVM is reserved for storing the physically adjacent row mapping table.

4. The apparatus of claim 2, wherein the physically adjacent row mapping table stored at the local memory corresponds to a copy of the physically adjacent row mapping table stored at the particular region of the NVM.

5. The apparatus of claim 2, wherein the physically adjacent row mapping table stored at the local memory corresponds to a subset of a full version of the physically adjacent row mapping table stored at the particular region of the NVM.

6. The apparatus of claim 2, wherein the security protocol includes one or more of a replay protected memory block (RPMB) security protocol or a replay protection monotonic counter (RPMC) security protocol.

7. A method of operation of a device, the method comprising:

sending one or more memory access commands to a volatile memory, the one or more memory access commands associated with a first address;

based on detecting a row-hammer condition associated with the one or more memory access commands, accessing a physically adjacent row mapping table to determine at least a second address, wherein the first address and the second address correspond to physically adjacent rows within the volatile memory; and sending one or more row refresh commands to the volatile memory based on the row-hammer condition, the one or more row refresh commands associated with at least the second address.

8. The method of claim 7, wherein the physically adjacent row mapping table indicates that the first address is associated with the second address and with a third address, and wherein the first address, the second address, and the third address correspond to the physically adjacent rows within the volatile memory.

9. The method of claim 8, wherein a particular row of the physically adjacent row mapping table includes a first field and a second field, wherein the first field indicates the second address, and wherein the second field indicates the third address.

10. The method of claim 9, wherein the physically adjacent row mapping table has a lookup table (LUT) format, and wherein the particular row is indexed within the physically adjacent row mapping table based on the first address.

11. The method of claim 9, wherein the first field is associated with a first quantity of bits used to represent the second address, and wherein the second field is associated with a second quantity of bits used to represent the third address, the second quantity of bits different than the first quantity of bits.

12. The method of claim 9, wherein the first field is associated with a first quantity of bits used to represent the second address, and wherein the second field is associated with a second quantity of bits used to represent the third address, the second quantity of bits equal to the first quantity of bits.

13. The method of claim 7, wherein the first address is a first logical address in a logical address space, and wherein the second address is a second logical address that is non-adjacent to the first logical address in the logical address space.

14. The method of claim 7, wherein detecting the row-hammer condition includes one or more of:

determining that a quantity of the one or more memory access commands exceeds a threshold quantity; or determining that a frequency associated with the one or more memory access commands exceeds a threshold frequency.

* * * * *